(12) United States Patent
Denis et al.

(10) Patent No.: US 6,269,802 B1
(45) Date of Patent: *Aug. 7, 2001

(54) FUEL TANK

(75) Inventors: Alain Denis; Philippe Rhoumy, both of Laval (FR); Paul Wouters, Vilvoorde; Georges Hore, Brussels, both of (BE)

(73) Assignee: Solvay, Brussels (BE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/200,948

(22) Filed: Nov. 30, 1998

(30) Foreign Application Priority Data

Dec. 2, 1997 (FR) .................................... 97 15269

(51) Int. Cl.⁷ .................................... F02M 33/02
(52) U.S. Cl. ............................ 123/519; 123/516
(58) Field of Search .................... 123/516, 518, 123/519, 520, 509

(56) References Cited

U.S. PATENT DOCUMENTS

| | | | |
|---|---|---|---|
| 3,610,220 | * 10/1971 | Yamada ................................ | 123/518 |
| 3,675,634 | * 7/1972 | Tatsutomi ............................. | 123/519 |
| 3,757,753 | * 9/1973 | Hunt ..................................... | 123/519 |
| 4,175,526 | 11/1979 | Phelan . | |
| 4,852,761 | 8/1989 | Turner et al. . | |
| 4,919,103 | 4/1990 | Ishiguro et al. . | |
| 5,215,132 | * 6/1993 | Kobayashi ........................... | 123/518 |
| 5,261,439 | * 11/1993 | Harris .................................. | 123/516 |
| 5,313,978 | * 5/1994 | Takaki ................................. | 123/516 |
| 5,326,514 | 7/1994 | Linden et al. . | |
| 5,408,977 | 4/1995 | Cotton . | |
| 5,566,705 | 10/1996 | Harris . | |
| 5,704,337 | * 1/1998 | Stratz .................................. | 123/516 |
| 5,809,976 | * 9/1998 | Cook ................................... | 123/516 |

FOREIGN PATENT DOCUMENTS

| | | |
|---|---|---|
| 4304180 | 8/1993 | (DE) . |
| 2 736 878 | 1/1997 | (FR) . |
| 0067960 | * 4/1983 | (JP) ..................................... 123/516 |

* cited by examiner

Primary Examiner—Carl S. Miller
(74) Attorney, Agent, or Firm—Larson & Taylor, PLC

(57) ABSTRACT

The invention relates to a fuel tank produced by moulding a synthetic resin, comprising a breather orifice and a chamber that is intended to contain a substance that adsorbs the fuel vapors. The said chamber has at least one wall portion that is common, and formed integrally by moulding, with a portion of the wall of the tank.

17 Claims, 3 Drawing Sheets

⟹ ADSORPTION
⇐┄┄ DESORPTION (PURGE)

FUEL TANK

Fuel tanks, particularly for motor vehicles, usually comprise a breather orifice to allow the internal pressure to be in equilibrium with the atmospheric pressure, for example when the fuel level varies as the result of the filling of the tank or the consumption of fuel by the engine, or alternatively with variations in temperature.

This breather orifice is conventionally connected to the atmosphere via a pipe and a chamber, commonly known as a canister, containing a substance that adsorbs the fuel vapors, usually activated charcoal. The purpose of the canister is to prevent fuel vapors from being released into the atmosphere.

FIG. 1 illustrates the conventional configuration of a fuel tank (1) equipped with a breather pipe (3) leading to a canister (5) that has an orifice communicating with the atmosphere (6). In order to prevent liquid fuel from entering the breather pipe and the canister, the breather orifice (2) of the tank is commonly fitted with a float valve (4). The vapors adsorbed in the canister are then desorbed, for example by means of a desorption pipe or purge circuit (7) connected to the engine inlet circuit (10) via an electrically-operated valve (9) The canister is therefore generally arranged in the engine compartment.

These conventional systems have some drawbacks. One of the main drawbacks is the long length of breather pipe between the tank and the canister. This great length entails a significant pressure drop as well as appreciable evaporation losses of fuel by diffusion through the wall of this pipe, which is usually made of plastic. These losses of fuel are damaging to the environment and are becoming increasingly subject to tight controls and standards.

The use of a metal pipe or of a polymer pipe that has a barrier layer does itself have economic or weight-related disadvantages.

Another disadvantage has to do with the numerous connections or joints that there are between the breather pipe and the tank, on the one hand, and the canister on the other. These pipes and joints, which are outside the tank, always represent points where the fuel is most likely to be lost and therefore constitute a source of fuel released into the atmosphere. At the present time, losses of this type can represent a significant proportion of the overall evaporation losses, a reduction in which is being sought.

Systems in which the canister is nearer to the tank have been designed in an attempt to find a solution to these drawbacks.

For example, Patent U.S. Pat. No. 4,919,103 in particular describes a fuel tank in which the canister is inserted through a wide opening and attached mechanically.

Patent U.S. Pat. No. 5,408,977 describes a plastic tank, part of the wall of which forms a cavity allowing the insertion of a canister.

All of these systems still have certain disadvantages. One of these is that the actual tank and the canister are still manufactured separately, which means that costly operations of producing the canister and subsequently fitting it are needed. Furthermore, the numerous pipes and connections that there are mean that substantial risks of evaporation losses and of leaks still remain.

The object of the present invention is therefore to incorporate the manufacture of the canister into the manufacture of the tank, to reduce the overall evaporation losses and leaks in the fuel-supply system, and to reduce the number of different parts that have to be produced and assembled.

Consequently, the invention relates to a fuel tank, produced by moulding a synthetic resin, comprising a breather orifice and a chamber that is intended to contain a substance that adsorbs the fuel vapors, which is characterized in that the said chamber has at least one wall portion that is common, and formed integrally by moulding, with a portion of the wall of the tank.

The tank in accordance with the present invention can be made of synthetic resin of any kind, thermoplastic or thermosetting. As a preference, the synthetic resin is thermoplastic. The said resin may comprise one or more polymers. These polymers may comprise homopolymers, copolymers or mixtures thereof. As a preference, the polymer is a polyolefine. Among polyolefins, high-density polyethylene is particularly preferred. The synthetic resin may also comprise any appropriate conventional additive.

The wall of the tank may also be single-layer or multi-layer. In the case of a multi-layer wall, one of the layers is preferably a layer made of a resin which acts as a barrier to the fuel.

The wall of the tank may also have undergone some sort of surface treatment. This may, in particular, be a chemical treatment, such as fluorination or sulphonation, intended to reduce the wall's permeability to hydrocarbons.

The tank may be made by moulding using any known technique, particularly by extrusion blow-moulding or injection moulding-welding. The extrusion blow-moulding technique is often adopted.

The substance that adsorbs the fuel vapors may be of any known kind. As a preference, it contains particles of activated charcoal.

The chamber intended to contain the substance that adsorbs the fuel vapors may be in various forms, so long as it has at least one wall portion that is common, and formed integrally by moulding, with a portion of the wall of the tank.

The present invention thus makes it possible to reduce the evaporation losses from the tank itself. This is because fuel diffusing through that portion of the wall of the tank that is common with the chamber intended to contain the adsorbing substance reaches this chamber directly instead of being released into the atmosphere.

Advantageously, the chamber intended to contain the adsorbent substance essentially consists of a portion of the wall of the tank and of a lid attached to this wall portion. As a particular advantage, the wall portion that is common to the tank and to the chamber essentially consists of a depression in the wall of the tank. For example, in the case of a tank that is made by extrusion blow-moulding, this depression is made using a projection on the wall of the mould and/or using a moving section of mould which can indent the wall while it is being produced. The depression in the wall is then filled with the adsorbent substance and closed using a lid of an appropriate shape. This particular configuration also allows the charge of adsorbent substance to be replaced easily at a later date if need be.

Advantageously, the lid comprises the connections needed for the canister to operate. To further reduce the permeability to fuel vapors of the device as a whole, the lid may be made of a substance that is impermeable to these vapors or may be made of a material which has undergone a surface treatment (for example fluorination) that reduces its permeability.

The breather orifice and its connection to the canister are made in any known way. In an advantageous embodiment, the breather orifice is connected to the chamber from inside the tank. Any fuel losses as a result of this connection will thus remain confined to the tank, which will further contribute to reducing the overall fuel losses. As a consequence, this configuration allows the use of materials that are less impermeable to the fuel and therefore less expensive, from which to make this connection.

According to a particularly advantageous alternative form, the breather orifice is located in the wall portion that is common to the chamber and the tank and places the chamber and the tank in direct communication. This particular configuration completely avoids recourse to a breather pipe and its associated connections. The pressure drops in the breather circuit are thus also markedly reduced. The saving in terms of the number of parts that have to be produced and assembled is also appreciable.

Whatever the location of the breather orifice in the upper part of the tank, this orifice may advantageously be fitted with at least one value. The purpose of such a valve is to avoid any liquid fuel entering the breather circuit (anti-splash or anti-spill function) and/or to shut off the said orifice if the vehicle rolls over or becomes steeply inclined (roll-over shut-off function). As a preference, the said valve fulfils both the "anti-splash" function and the "roll-over shut-off" function. As is well known, such a combined valve (ROV for "roll-over valve") may, in particular consist of a float sliding vertically in a sleeve and of a high-density ball.

The breather orifice may also comprise other accessories, possibly placed in series with the above valve, such as an over-fill prevention valve (OPV). Such a valve may, for example, be made using a ball placed on a conical surface with a wide cone angle, the central point of which is holed. A rest, and particularly while the tank is being filled, the ball positions itself at the centre of the cone and thus closes the breather circuit. When the vehicle is in motion, the ball moves off the surface and thus undercovers the orifice.

The OPV and the ROV may advantageously be combined into a single piece, thus limiting the manufacture and assembly costs.

Another accessory that may possibly be placed downstream of the valve or valves described above is a particles filter that prevents dust or any small particles of the adsorbent substance from entering the valve or valves or the tank.

In a preferred embodiment of the tank according to the invention, the chamber intended to contain the adsorbent substance may contain various valves and accessories described above, or alternatively may contain other components such as, for example, the electrically operated valve that opens and closes the desorption circuit or alternatively a pressure-regulating safety valve (or PRV) intended to keep the pressure in the tank between a pre-established minimum value and a preestablished maximum value. This embodiment makes it even easier to incorporate all of the breather circuit components into the said chamber.

When this chamber is formed of a depression in the-wall of the tank closed up again by means of a lid, the device as a whole is then completely "invisible" from the outside.

In a particular enhancement, the chamber intended to contain the adsorbent substance comprises a partition that divides the volume intended for the said substance into two parts. This partition forces the fuel vapors to follow a U-shaped path, which lengthens their journey and improves the efficiency of the system. This partition can be held onto one wall of the chamber or onto the lid there may be by welding. With this U-configuration, it is particularly judicious for the tank breather orifice and any associated components, and the desorption circuit orifice to be placed on the same side of the said partition (the upstream side), while the orifice leading to the atmosphere is placed on the other side (the downstream side) of the partition. In this way, gas exchanges are also optimized during the phase in which the adsorbent substance is purged.

Let us note too that, according to a particular alternative form, the desorption circuit instead of comprising a means of communication with the inlet circuit may advantageously comprise a condenser returning the liquid fuel directly to the tank. In this way, the number of pipes between the tank and the engine compartment is further reduced, and this contributes to further reducing the leaks of fuel to the atmosphere.

The following figures illustrate the invention without implying any limitation.

FIG. 2b is a view in section on line AA' of FIG. 2a.

Figure 1:
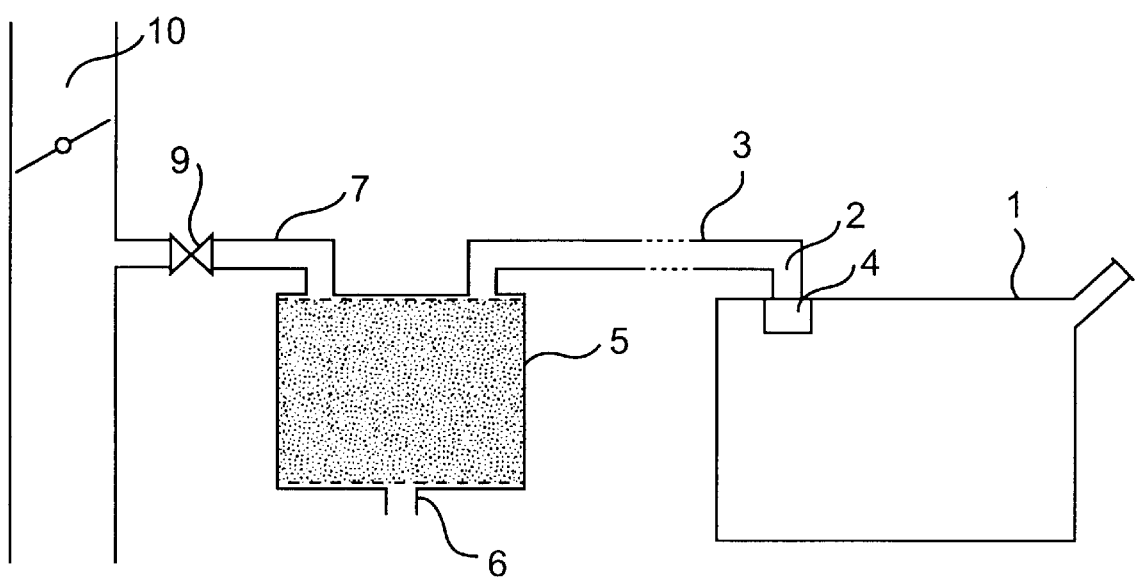
Figure 2A:
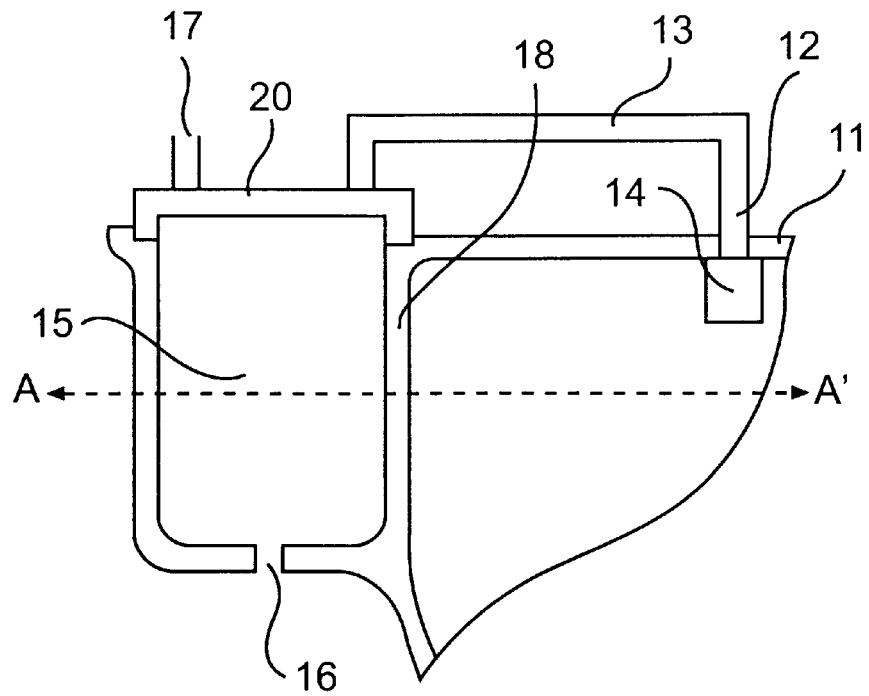
FIG. 2a shows a first embodiment of a tank in accordance with the invention.
Figure 2B:
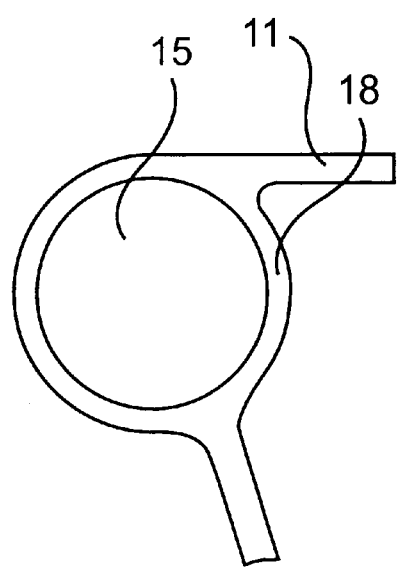

In the first embodiment of a tank according to the invention, as illustrated by FIGS. 2a and 2b, the wall (11) of the tank comprises, in its upper part, a breather orifice (12). The said wall (11) also has a portion (18) that is common to a wall portion of the chamber (15) intended to contain the adsorbent substance. The breather orifice (12) is connected to the chamber (15) by a pipe (13) that is outside the tank. This pipe (13) is fitted at its tank end with a valve (14) which combines the "anti-splash" and "rollover shut-off" functions. At its opposite end, the pipe (13) is fixed to a connector borne by the lid that closes the chamber (15). This lid also bears a connector connected to the desorption circuit (17). The chamber (15) is equipped with an orifice (16) for communicating with the atmosphere.

Figure 3A:
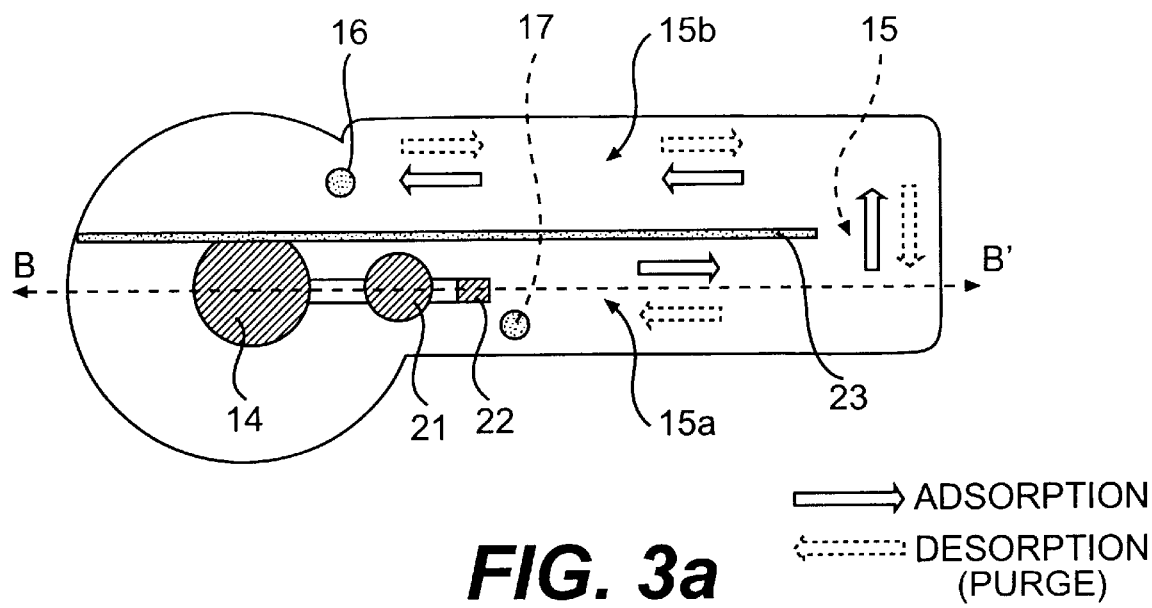
FIG. 3a shows a second embodiment of a tank in accordance with the invention.
Figure 3B:
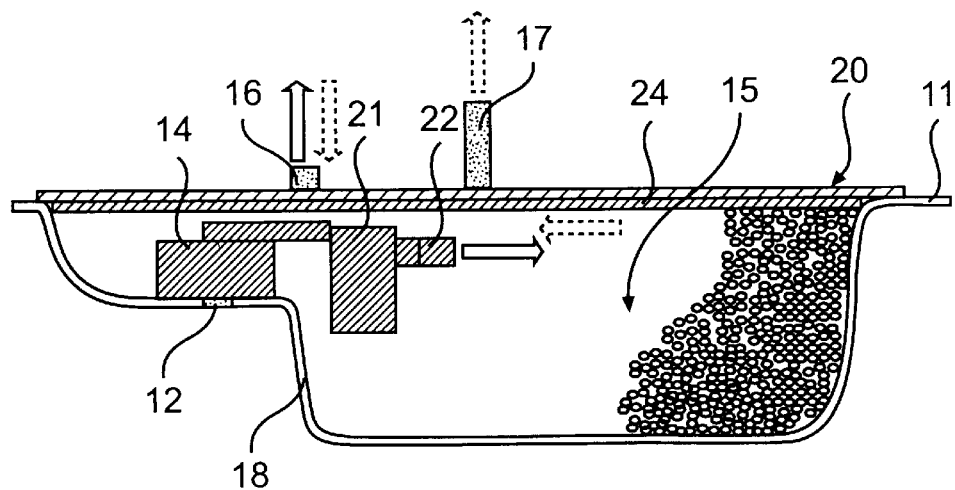
FIG. 3b is a view in section on line BB' of FIG. 3a and, in addition, partially shows the charge of adsorbent material.

A second embodiment of a tank according to the invention is illustrated by virtue of FIGS. 3a and 3b. The chamber (15) essentially consists of a depression in the wall (11) of the tank, onto which depression the lid (20) is attached. The breather orifice (12) of the tank is located in that wall portion (18) that is common to the tank and to the chamber (15).

The valve (14), which combines the "anti-splash" and "rollover shut-off" functions is situated inside the volume of the chamber (15). A valve (21) which fulfils the "over-fill prevention" function is connected in series with the valve (14). The outlet of this valve (21) is fitted with a small particles filter (22) preventing dust and/or particles of the adsorbent material (activated charcoal in this particular instance) from entering the various valves and the fuel tank.

The vertical partition (23) creates a partial divide between the "upstream" region (15a) and the "downstream" region (15b) of the chamber (15), thus lengthening the path that the gases passing through this chamber have to follow and therefore improving the efficiency of the adsorbent. The vertical partition (23) is fixed as desired either to the lid (20) or to the end wall of the chamber (15), that is to say to the wall portion (18).

During the adsorption phase (with the tank at a raised pressure compared with atmospheric pressure), the air and the fuel vapors from the tank enter the "upstream" region (15a) of the chamber (15) via the valves (14) and (21) and the filter (22). The path taken by these gases is shown by the arrows that are in solid line. After the fuel vapors have been adsorbed, the cleaned air reaches the atmosphere via the orifice (16) on the "downstream" side (15b) of the chamber (15).

During the desorption phase (purge phase), a depression is created in the desorption circuit (17), ending in the region (15a) of the chamber (15). Atmospheric air is thus drawn in through the orifice (16), following the path indicated by the arrows that are in dotted line. The activated charcoal desorbs the fuel vapors and the air, enriched with these vapors, enters the purge circuit. These fuel vapors will therefore either be injected into the engine inlet circuit or condensed and collected in the tank.

To immobilize the activated charcoal and prevent the particles of this charcoal from leaving the chamber (15) via the orifice (16) and/or the circuit (17), the lid (20) is equipped with a layer (24) of foam, for example polyurethane foam.

What is claimed is:

1. A fuel tank, produced by molding a synthetic resin, said tank including a wall and comprising a chamber for containing a substance that adsorbs fuel vapors, said chamber including a first breather orifice, a second orifice open to atmosphere and a third orifice connected to a desorption circuit, said chamber having at least one wall portion in common with, and molded integrally with, a portion of the wall of the tank, said chamber being connected to the breather orifice from inside the tank, said breather orifice being located in the wall portion common to the chamber and the tank and said breather orifice placing the chamber in direct communication with the tank.

2. A fuel tank according to claim 1, produced by molding using an extrusion-blow molding technique.

3. A fuel tank according to claim 1, in which the chamber comprises a portion of the wall of the tank and a lid attached to said portion of the wall.

4. A fuel tank according to claim 3, in which the wall portion common to the tank and to the chamber comprises a depression in the wall of the tank.

5. A fuel tank according to claim 1, in which the breather orifice is fitted with at least one valve.

6. A fuel tank according to claim 5, in which the at least one valve comprises a valve fulfilling both an "anti-splash" function and a "rollover shut-off" function.

7. A fuel tank according to claim 5, in which an over-fill prevention valve is disposed in series with the valve.

8. A fuel tank according to claim 1, in which the desorption circuit comprises a condenser for retaining liquid fuel directly to the tank.

9. A fuel tank, produced by molding a synthetic resin, said tank including a wall and comprising a chamber for containing a substance that adsorbs fuel vapors, said chamber including a first breather orifice, a second orifice open to atmosphere and a third orifice connected to a desorption circuit, said chamber having at least one wall portion in common with, and molded integrally with, a portion of the wall of the tank, said breather orifice being located in the wall portion common to the chamber and the tank, said breather orifice placing said chamber in direct communication with said tank, and said breather orifice being fitted with a valve disposed in series with an over-fill prevention valve.

10. A fuel tank, produced by molding a synthetic resin, said tank including a wall and comprising a chamber for containing a substance that adsorbs vapors, said chamber including a first breather orifice, a second orifice open to the atmosphere and a third orifice connected to a desorption circuit, said chamber having at least one wall portion in common with and molded integrally with a portion of the wall of said tank, said chamber being external to said tank and sharing the common wall portion with said tank and the common wall portion comprising an exterior lateral wall of the tank.

11. A fuel tank according to claim 10, produced by molding using an extrusion-blow molding technique.

12. A fuel tank according to claim 10, in which said chamber comprises a portion of said wall of said tank and of a lid attached to said portion of said wall.

13. A fuel tank according to claim 12, in which said wall portion common to said tank and to said chamber comprises a depression in said wall of said tank.

14. A fuel tank according to claim 10, in which said breather orifice is fitted with at least one valve.

15. A fuel tank according to claim 14, in which an over-fill prevention valve is disposed in series with said valve.

16. A fuel tank according to claim 14, in which the at least one valve comprises a valve fulfilling both an "anti-splash" function and a "rollover shut-off" function.

17. A fuel tank according to claim 10, in which the desorption circuit comprises a condenser for retaining liquid fuel and returning it directly to the tank.

* * * * *